United States Patent
Lambert et al.

(10) Patent No.: US 12,387,014 B2
(45) Date of Patent: Aug. 12, 2025

(54) SYSTEM AND METHOD FOR MANAGING ACCESS TO INFORMATION REGARDING OPERATION OF HARDWARE COMPONENTS OF DATA PROCESSING SYSTEMS

(71) Applicant: Dell Products L.P., Round Rock, TX (US)

(72) Inventors: Timothy M. Lambert, Austin, TX (US); Milton Olavo Decarvalho Taveira, Round Rock, TX (US); Isaac Qin Wang, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 382 days.

(21) Appl. No.: 18/159,924

(22) Filed: Jan. 26, 2023

(65) Prior Publication Data

US 2024/0256715 A1 Aug. 1, 2024

(51) Int. Cl.
  G06F 21/71 (2013.01)
  G06F 21/44 (2013.01)
  G06F 21/60 (2013.01)

(52) U.S. Cl.
  CPC .............. *G06F 21/71* (2013.01); *G06F 21/44* (2013.01); *G06F 21/602* (2013.01); *G06F 21/604* (2013.01)

(58) Field of Classification Search
  None
  See application file for complete search history.

(56) References Cited

U.S. PATENT DOCUMENTS

| | | | |
|---|---|---|---|
| 5,996,077 A * | 11/1999 | Williams | H04L 63/0823 726/12 |
| 6,557,170 B1 | 4/2003 | Wilder | |
| 7,308,705 B2 | 12/2007 | Gordy et al. | |
| 7,877,788 B1 * | 1/2011 | Topp | G06F 21/44 726/17 |
| 7,970,279 B2 | 6/2011 | Dress | |
| 9,331,899 B2 | 5/2016 | Christopher et al. | |
| 9,436,820 B1 * | 9/2016 | Gleichauf | H04L 63/02 |
| 9,450,901 B1 | 9/2016 | Smullen | |
| 9,537,865 B1 * | 1/2017 | Borovoy | H04L 63/10 |

(Continued)

FOREIGN PATENT DOCUMENTS

| | | |
|---|---|---|
| WO | 2007044899 A2 | 4/2007 |
| WO | 2013150872 A1 | 10/2013 |

OTHER PUBLICATIONS

"DC-MHS R1 Overview," 2022 OCP Global Summit (56 Pages).

(Continued)

*Primary Examiner* — Kambiz Zand
*Assistant Examiner* — Mahabub S Ahmed
(74) *Attorney, Agent, or Firm* — WOMBLE BOND DICKINSON (US) LLP

(57) ABSTRACT

Methods and systems for managing operation of data processing systems are disclosed. To manage the operation of the data processing systems, access to information regarding the operation of hardware components of the data processing systems may be provided. The access may be provided by configuring the internal communication topology of the data processing systems. The topologies may be configured to limit access to unvalidated entities, and provide access to validated entities.

20 Claims, 7 Drawing Sheets

(56) References Cited

U.S. PATENT DOCUMENTS

| | | | |
|---|---|---|---|
| 9,673,979 B1* | 6/2017 | Poole | H04L 9/0836 |
| 9,684,575 B2 | 6/2017 | Breakstone et al. | |
| 10,019,388 B2 | 7/2018 | Long et al. | |
| 10,187,373 B1* | 1/2019 | Poole | H04L 9/3213 |
| 10,261,561 B2 | 4/2019 | Chuang et al. | |
| 10,673,862 B1* | 6/2020 | Threlkeld | G06F 21/62 |
| 10,733,116 B2* | 8/2020 | Litichever | G06F 21/82 |
| 11,029,742 B2 | 6/2021 | Webel et al. | |
| 11,112,846 B2 | 9/2021 | Strach et al. | |
| 11,240,025 B2* | 2/2022 | Wentz | G06F 21/602 |
| 11,269,537 B2* | 3/2022 | Prohofsky | G06F 3/0659 |
| 12,211,033 B1* | 1/2025 | Burton | G06F 21/44 |
| 2002/0112181 A1* | 8/2002 | Smith | H04L 63/105 |
| | | | 726/14 |
| 2005/0030970 A1 | 2/2005 | Britton | |
| 2005/0162253 A1* | 7/2005 | Wilson | H04L 63/10 |
| | | | 340/5.2 |
| 2006/0031924 A1* | 2/2006 | Kwon | H04L 63/08 |
| | | | 726/2 |
| 2006/0133409 A1* | 6/2006 | Prakash | H04W 28/18 |
| | | | 370/450 |
| 2008/0126629 A1* | 5/2008 | Huang | G06F 3/038 |
| | | | 710/64 |
| 2008/0172737 A1* | 7/2008 | Shen | G16H 10/60 |
| | | | 726/21 |
| 2009/0296640 A1 | 12/2009 | Gilbert | |
| 2009/0300329 A1 | 12/2009 | Naffziger et al. | |
| 2010/0153859 A1 | 6/2010 | Dawson | |
| 2010/0306547 A1* | 12/2010 | Fallows | H04L 63/0815 |
| | | | 713/178 |
| 2012/0204254 A1* | 8/2012 | Voss | G06F 21/57 |
| | | | 726/18 |
| 2013/0036311 A1* | 2/2013 | Akyol | H04L 63/08 |
| | | | 713/189 |
| 2014/0047531 A1* | 2/2014 | Zaitsev | G06F 21/62 |
| | | | 726/9 |
| 2014/0068717 A1* | 3/2014 | Mayes | H04W 12/08 |
| | | | 726/3 |
| 2014/0108801 A1* | 4/2014 | McBride | H04L 63/12 |
| | | | 713/168 |
| 2014/0181892 A1* | 6/2014 | Von Bokern | H04L 9/0877 |
| | | | 726/1 |
| 2015/0242606 A1* | 8/2015 | Shin | G06F 21/602 |
| | | | 726/17 |
| 2016/0065377 A1* | 3/2016 | Ichijo | H04W 12/12 |
| | | | 713/175 |
| 2016/0352733 A1* | 12/2016 | Oxford | H04L 9/0866 |
| 2017/0147052 A1 | 5/2017 | Waters et al. | |
| 2017/0228532 A1* | 8/2017 | Tomar | H04L 67/1097 |
| 2017/0346644 A1* | 11/2017 | Cambou | H04L 63/08 |
| 2018/0034858 A1* | 2/2018 | Gummaraju | H04L 63/08 |
| 2018/0146369 A1* | 5/2018 | Kennedy, Jr. | H04W 12/04 |
| 2018/0247081 A1* | 8/2018 | Helsel | G06F 21/86 |
| 2018/0352440 A1* | 12/2018 | Ballard | H04L 9/3231 |
| 2019/0052617 A1* | 2/2019 | Chen | H04L 9/3234 |
| 2019/0052638 A1* | 2/2019 | Agarwal | H04W 12/08 |
| 2019/0289038 A1* | 9/2019 | Li | H04L 9/3215 |
| 2019/0305964 A1* | 10/2019 | Hamel | H04L 9/0891 |
| 2020/0351091 A1* | 11/2020 | Gardner | H04L 9/3213 |
| 2021/0034405 A1 | 2/2021 | Halim | |
| 2021/0056184 A1* | 2/2021 | Modani | G06F 21/44 |
| 2021/0258774 A1* | 8/2021 | Ramsay, III | H04W 12/63 |
| 2022/0078238 A1* | 3/2022 | Nixon | G06F 9/4401 |
| 2022/0130432 A1 | 4/2022 | Jayapal et al. | |
| 2022/0376919 A1* | 11/2022 | Goshon | H04L 9/50 |
| 2023/0195912 A1* | 6/2023 | Saxena | H04L 9/3247 |
| | | | 726/20 |
| 2023/0222137 A1* | 7/2023 | Aucinas | G06F 16/252 |
| | | | 707/802 |
| 2024/0080195 A1* | 3/2024 | Schrum | H04L 9/3213 |
| 2024/0303380 A1* | 9/2024 | Ponnuru | G06F 21/85 |

OTHER PUBLICATIONS

Kennedy, Jeff et al., "Peripheral Sideband Tunneling Interface (M-PESTI)," Datacenter—Modular Hardware Systems (DC-MHS) Rev 1.0, Apr. 27, 2022 (50 Pages).

"Why won't the computer wake up when connected over USB," Belkin Official Support, Web Page <https://www.belkin.com/support-article/?articleNum=8130>, accessed on Oct. 17, 2022 (2 Pages).

"Clock Gating for Power Reduction," CoQube Analytics and Services, 2021, Web Page <https://coqube.com/clock-gating-for-power-reduction/>, accessed on Oct. 17, 2022 (12 Pages).

Kennedy, Patrick, "Liquid Cooling Next-Gen Servers Getting Hands-on with 3 Options," ServeTheHome, Aug. 2, 2021, Web Page <https://www.servethehome.com/liquid-cooling-next-gen-servers-getting-hands-on-3-options-supermicro/4/>, accessed on Oct. 17, 2022 (10 Pages).

* cited by examiner

SYSTEM AND METHOD FOR MANAGING ACCESS TO INFORMATION REGARDING OPERATION OF HARDWARE COMPONENTS OF DATA PROCESSING SYSTEMS

FIELD

Embodiments disclosed herein relate generally to operation management. More particularly, embodiments disclosed herein relate to systems and methods to manage access to information regarding operation of hardware components of data processing systems.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components and the components of other devices may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
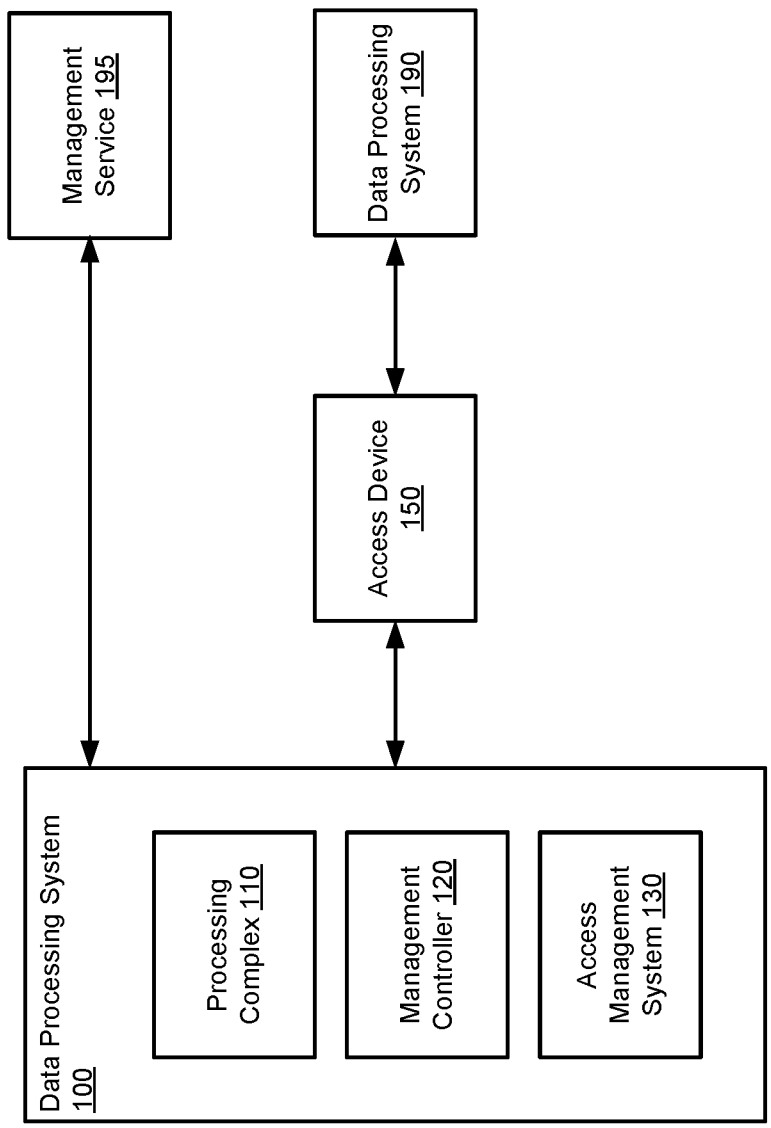
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of data processing systems. To manage the operation of the data processing systems, an access device may be used to obtain information regarding the operation of hardware components of the data processing systems.

To allow the access device to obtain the information while also managing access to the information, the data processing systems may include an internal communication topology that may be reconfigured to facilitate validation of the access device and access to the information.

Prior to an access device being allowed access to the information regarding a device, the access device may be subject to validation. If the access device cannot be validated, then access to the information may be denied. In contrast, if the access device is validated, then access to the information may be allowed.

The information may be provided, for example, by the hardware component itself. For example, the hardware device may include a debug pin or other management access pin that may provide access to information regarding the operation of the hardware component.

By doing so, a data processing system in accordance with an embodiment may be more likely to be able to provide desired computer implemented services. For example, by allowing information regarding the operation of hardware components to be obtained, issues impacting its operation may be addressed. Consequently, the data processing system may be less likely to exhibit issues that may otherwise impair the provided computer implemented services. Thus, embodiments disclosed herein may address, among other technical problems, the technical problem of undesired operation of data processing systems by facilitating access to information usable to remediate the undesired operation.

In an embodiment, a method for managing operation of a data processing system is provided. The method may include identifying an occurrence of an attachment of an access device to the data processing system; based on the occurrence: configuring a first portion of an access management system of the data processing system to place the access device in communication with a management controller of the data processing system; making a determination, using the management controller while in communication with the access device, regarding whether the access device can be authenticated; in a first instance of the determination where the access device is authenticated: configuring a second portion of the access management system to place the access device in communication with a secure portion of a processor; while the access device is in communication with the secure portion of the processor, making an identification of an occurrence of an expiration of a security token used to authenticate the access device; and based on the expiration, configuring the second portion of the access management system to deny access to the secure portion of the processor.

The method may also include, in a second instance of the determination where the access device is not authenticated: denying the access device any access to the secure portion of the processor.

Identifying an occurrence of the attachment of the access device to the data processing system may include obtaining, by a logic device of the data processing system while operably connected to the access device via a 1-wire interface, a data package indicating, a type of the access device, a part number for the access device, a serial number for the access device, and a first portion of cryptographic data; and notifying the management controller of the occurrence of the attachment based on the data package.

Configuring the first portion of the access management system of the data processing system to place the access device in communication with the management controller of the data processing system may include configuring, by the management controller, a first multiplexer adapted to selectively connect a portion of the processor or the management controller to a port of the data processing system to which the access device is operably connected.

Configuring the second portion of the access management system to place the access device in communication with the secure portion of the processor may include configuring, by the management controller, a second multiplexer adapted to selectively connect the secure portion of the processor or an unsecure portion of the processor to the port of the data processing system to which the access device is operably connected.

The secure portion of the processor may provide access to operation information of the processor.

Making the determination may include performing a cryptographic operation using the data package and the security token to obtain a result; and using the result to make the determination.

The security token may be bound to the management controller, the access device, and the processor. For example, the security token may require identifiers of all three devices to be used to cryptographically verify an attached access device. If corresponding identifiers are not used in a cryptographic operation, then the result of the cryptographic operation may indicate that the access device is not valid. The security token may be generated during a registration process with a service where the management controller, access device, and processor are registered.

In an embodiment, a non-transitory media is provided. The non-transitory media may include instructions that when executed by a processor cause the computer implemented method to be performed.

In an embodiment, a data processing system is provided. The data processing system may include the non-transitory media, and a processor, and may perform the computer implemented method when the computer instructions are executed by the processor.

Turning to FIG. 1, a block diagram illustrating a system in accordance with an embodiment is shown. The system shown in FIG. 1 may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, the system may include any number of data processing system 100. Data processing system 100 may provide the computer implemented services to users of data processing system 100 and/or to other devices (not shown).

To provide the computer implemented services, data processing system 100 may include various hardware components (e.g., processors, memory modules, storage devices, etc.) and host various software components (e.g., operating systems, application, startup managers such as basic input-output systems, etc.). These hardware and software components may provide the computer implemented services via their operation.

To provide the computer implemented services, various hardware components may need to operate nominally (e.g., as expected, in accordance with specifications, etc.). If the hardware components do not operate nominally, the computer implemented services may be impaired (e.g., not provided, not meet all expectations, may include errors in operation, etc.).

To operate nominally, for example, hardware components may need to operate in predetermined manners. To operate in the predetermined manners, the hardware components may need to perform certain operations. If these operations are not performed as expected, then the hardware components may not operate nominally.

In general, embodiments disclosed herein may provide methods, systems, and/or devices for managing the operation of data processing systems that provide computer implemented services. To manage the operation of a data processing system (e.g., 100), information regarding the operation of hardware components (e.g., such as processors of processing complex 110) may be obtained. The information may be used to identify why the hardware components did not operate nominally, and/or to otherwise modify the operation of the hardware components so that they are more likely to operate nominally in the future.

To obtain the information, data processing system 100 may include management controller 120 and access management system 130. Access management system 130 may facilitate selective access to processors or other hardware components to external devices such as access device 150. Management controller 120 may, prior to access management system 130 providing the access, validate that the access devices are to be provided with access to the hardware components.

For example, access management system 130 may allow external devices to operably connect to debugging pins (e.g., secure portions) of processors or other hardware components thereby allowing for information regarding the operation of the processors to be obtained by the external devices. Access management system 130 may do so by selectively connecting external ports of data processing system 100 to the pins once an external device has been validated as being authorized to access the secure portions of the hardware components. Refer to FIGS. 2A-2D regarding access management system 130.

To validate the devices, management controller 120 may obtain tokens or other types of data structures from management service 195. The tokens may include information usable to cryptographically validate whether external devices are authorized to access the secure portions of the hardware components. Once an external device is validated, management controller 120 may instruct access management system 130 to modify the internal connectivity of data processing system 100 to place an external device such as access device 150 in operable communication with a secure portion of a hardware component.

Once connected, access device 150 may place another device (e.g., data processing system 190) into operable communication with the secure portion of the hardware component. For example, access device 150 may be implemented as a universal serial bus compatible device. When connected to a universal serial bus port of data processing system 100, access device 150 may negotiate with management controller 120 to establish an operable connection to the secure portion of a hardware component. Once connected, access device 150 may operate as a pass through device for another device (e.g., data processing system 190) operably connected to access device 150. In this manner, another device may be placed in operably communication with a secure portion of a hardware component (e.g., a processor of processing complex 110).

Once connected, data processing system 190 may obtain information regarding the operation of a hardware component usable to identify why undesired operation of the hardware component may take place.

Management service 195 may, as noted above, provide management controller 120 with tokens or other types of data structures usable to perform validations. The tokens may be bound to combinations of data processing systems, management controllers, and access devices. Thus, combinations of these devices may be registered with management service 195 to facilitate secure validations of access devices. Management service 195 and management controller 120 may implement any security framework to secure communications between them.

Figure 3:
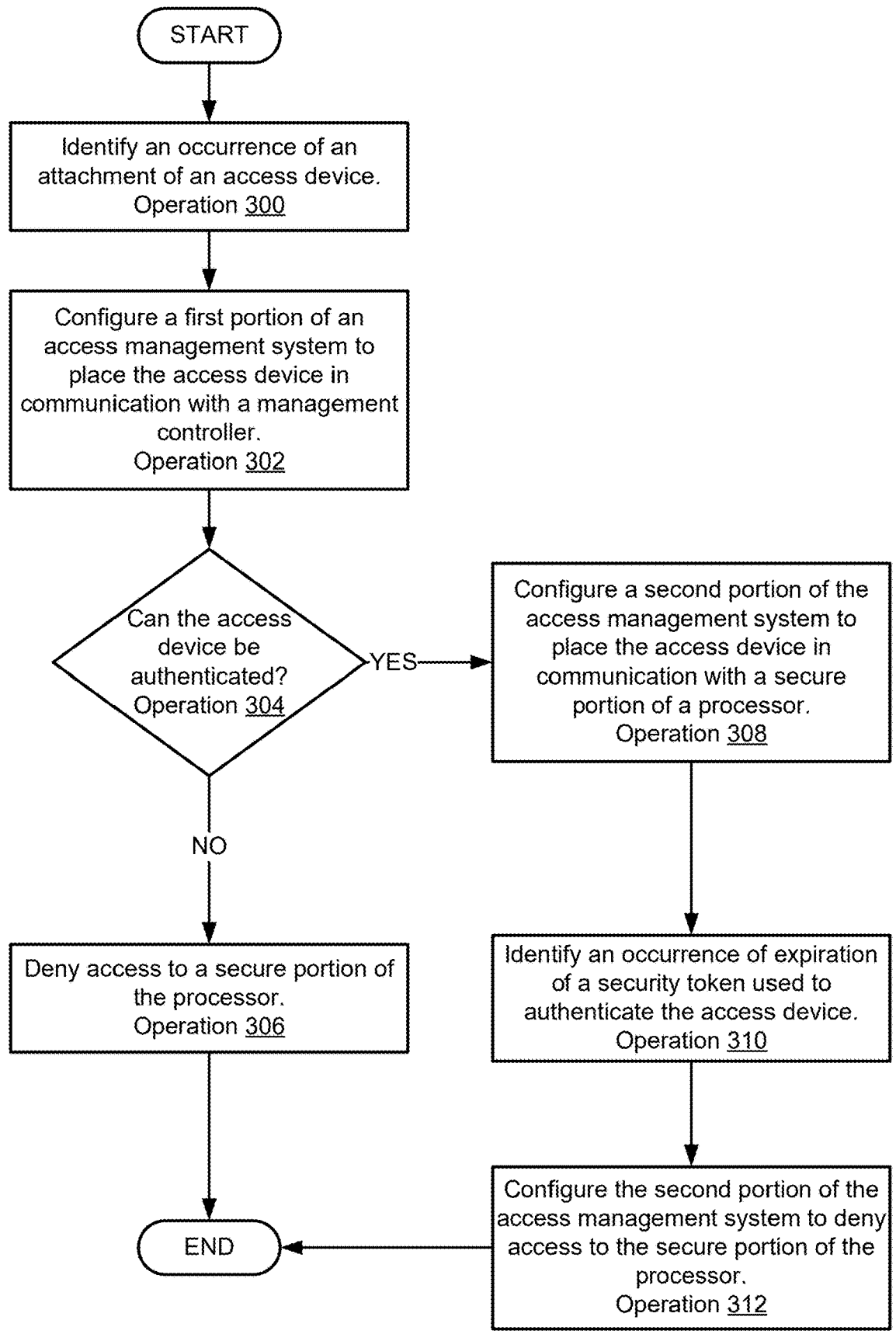
FIG. 3 shows a flow diagram illustrating a method of managing the operation of data processing systems in accordance with an embodiment.

When providing its functionality, data processing system 100 (and/or component thereof) may perform all, or a portion, of the method illustrated in FIG. 3.

Data processing system 100 and/or management service 195 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Management controller 120 may be implemented using, for example, a baseboard management controller, an out of band or in band management controller, a system on a chip, or other type of computing device that may operate independently from processing complex 110 and/or other in band components of data processing system 100. Management controller 120 may be operably connected to management service 195 via a network interface (e.g., independent from or managed by data processing system 100. For example, management controller 120 may be operably connected to management service 195 via one or more networks (e.g., such as the Internet).

While illustrated in FIG. 1 as included a limited number of specific components, a system in accordance with an embodiment may include fewer, additional, and/or different components than those illustrated therein.

To further clarify embodiments disclosed herein, diagrams illustrating communication paths in accordance with an embodiment are shown in FIGS. 2A-2D.

Figure 2A:
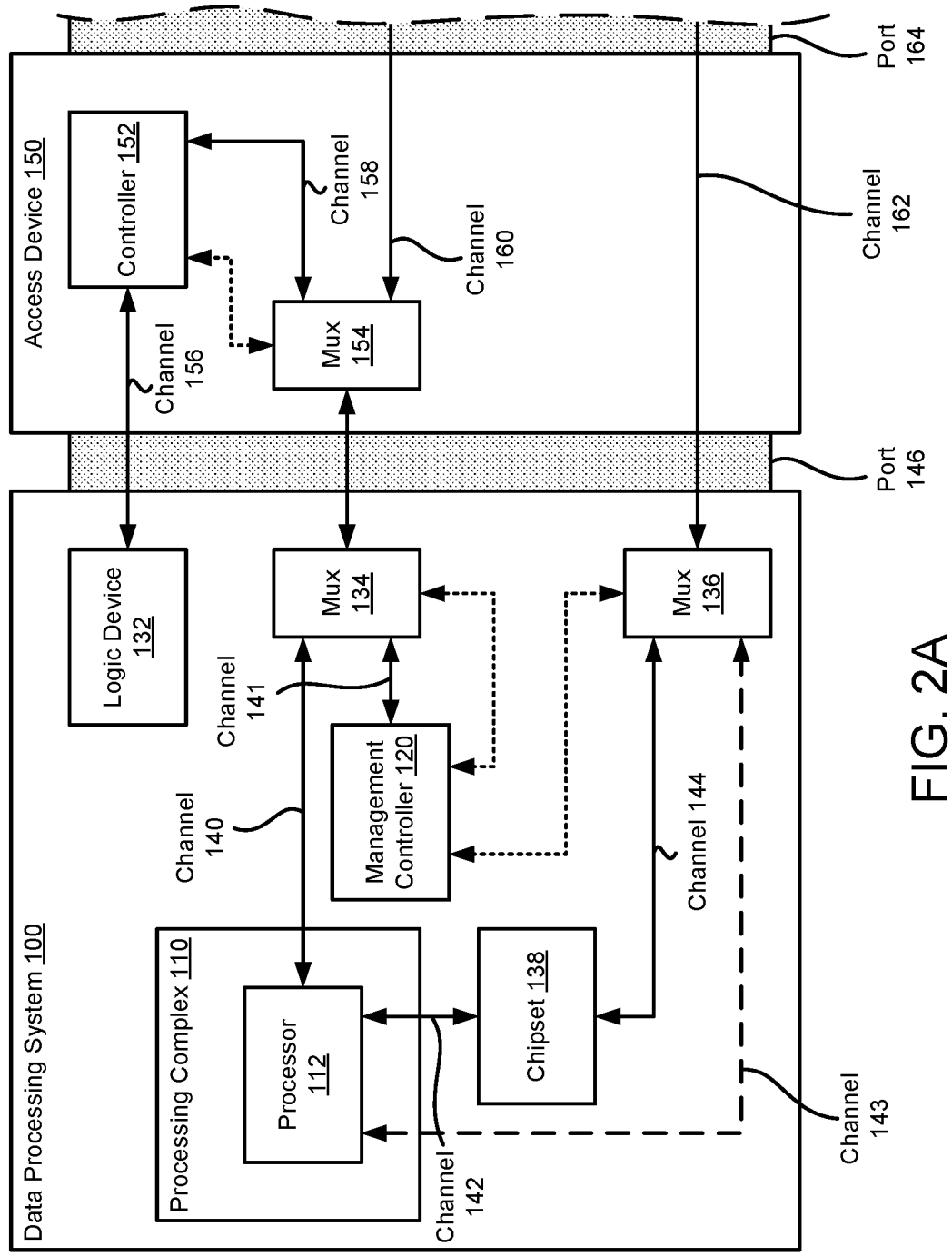
FIGS. 2A-2D show diagrams illustrating connectivity of a system in accordance with an embodiment.

Turning to FIG. 2A, a first communication topology diagram in accordance with an embodiment is shown.

To obtain information regarding operation of hardware components of data processing system 100 such as processor 112, access device 150 may include controller 152 and multiplexer (e.g., mux) 154. Controller 152 may include information usable to authenticate access device 150 to management controller 120.

While access device 150 is connected to data processing system 100 via port 146, controller 152 may be operably connected to logic device 132 via channel 156. Channel 156 may be implemented using a 1-wire connection. Access device 150 may announce its presence to data processing system 100 via the 1-wire connection.

Mux 154 may multiplex channel 160 and channel 158 to data processing system 100. Channel 158 may support data communications between controller 152 and connected components of data processing system (e.g., to management controller 120). Channel 160 may support data communications between a device connected to access device via port 164 and components of data processing system 100. For example, channel 158 and channel 160 may support communication protocol compliant communications such as I2C communications.

Controller 152 may be operably connected to a selection input of mux 154 (e.g., via the dashed line terminating in arrows interconnecting them). Consequently, controller 152 may selectively place itself or the connected device to port 164 into communication with data processing system 100 via mux 154.

Additionally, access device 150 may operably connect a device connected to port 164 to data processing system 100 via channel 162. Channel 162 may support data communications. As will be discussed below, channel 162 may be used to support data communications or to monitor the operation of processor 112 via channel 143.

Port 146 and port 164 may be implemented with universal serial bus compliant ports. The ports may be of similar or different types.

To both (i) support communications between processor 112 and other devices and (ii) provide access to information regarding the operation of processor 112, access management system 130 of data processing system 100 may include logic device 132, mux 134, mux 136, and chipset 138. Each of these components is discussed below.

Logic device 132 may identify attachments of access device 150 to data processing system. To do so, logic device 132 may receive communication from controller 152 (e.g., via channel 156) and notify management controller 120 of the presence of controller 152.

When an attachment is identified, management controller 120 may configure mux 134 to place it into communication with controller 152. To do so, management controller 120 may be operably connected to a selection input of mux 134 (e.g., via the dashed line terminating in arrows interconnecting them). Consequently, management controller 120 may selectively place itself or processor 112 into communication with access device 150 or devices connected to access device 150.

When operably connected to controller 152, management controller 120 may attempt to authenticate access device 150 (e.g., using a token obtained from management service 195). If authenticated, management controller 120 may configure mux 136 to a device connected to access device 150 into operable communication with a secure portion of processor 112 via channel 143 and channel 162. To do so, management controller 120 may be operably connected to a selection input of mux 136 (e.g., via the dashed line terminating in arrows interconnecting them). Consequently, management controller 120 may selectively place a secure portion of processor 112 (e.g., a debug pin) or an unsecure portion of processor 112 (e.g., a communication pin via channel 142 and channel 144) into communication with devices operably connected to port 146.

When a device cannot be authenticated or loses its status as being authenticated, management controller 120 may disconnect the secure portion of processor 112 from port 146. For example, when a device connected to port 146 has not been connected, management controller 120 may configure mux 136 to place chipset 138 (e.g., a protocol compliant chipset that facilitates data communication) into communication with port 146 and disconnect a secure portion of processor 112 from port 146.

Any of muxes 134, 136, 154 may be implemented using one or more circuits (e.g., integrated circuits). The muxes may facilitate multiplexing of communications between multiple devices thereby allow for reconfiguration of the internal operable connections of data processing system 100.

While some channels and interconnections are shown in FIG. 2A, other operable connections (e.g., between logic device 132 and management controller 120) may exist without departing from embodiments disclosed herein.

Figure 2B:
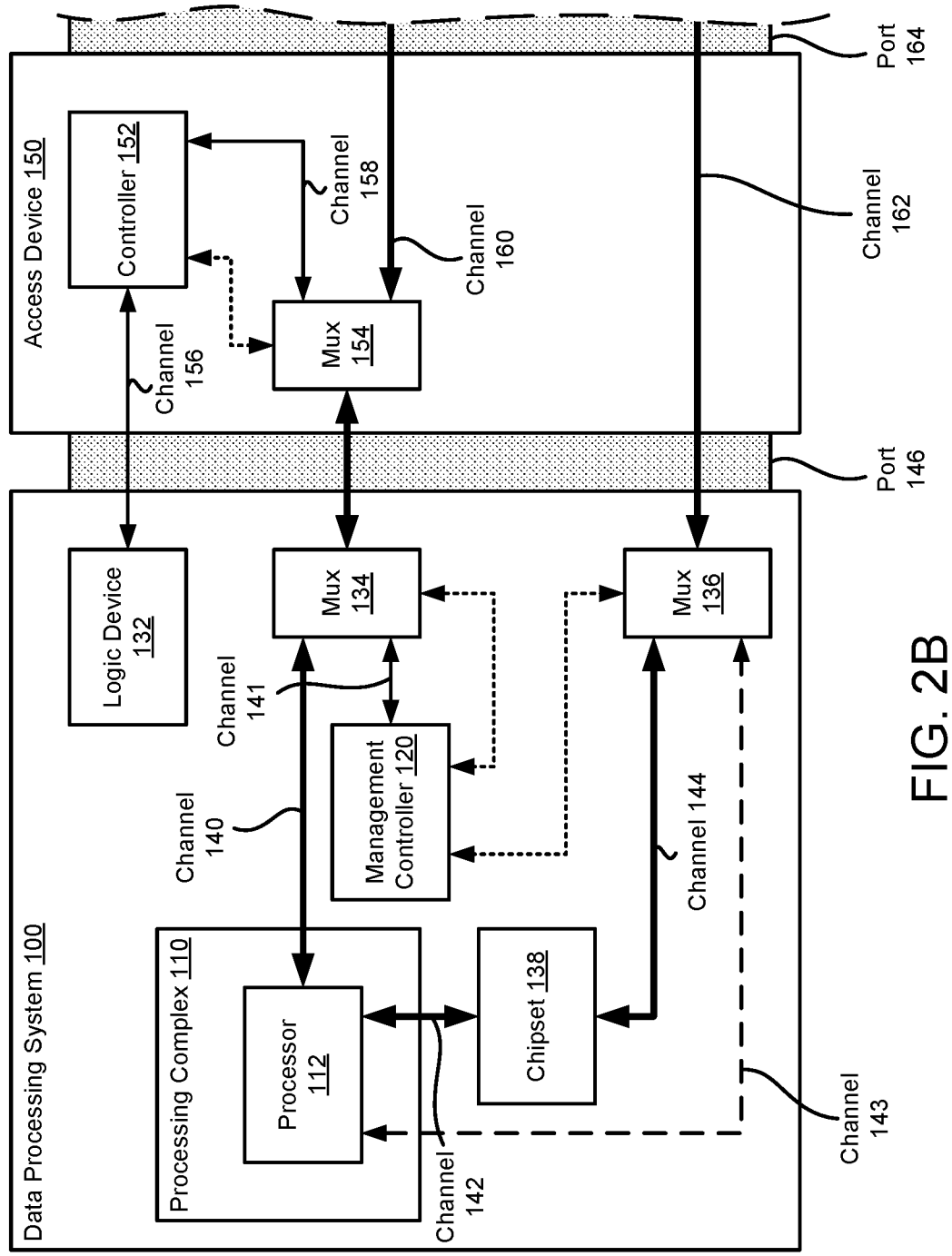

Turning to FIG. 2B, a second communication topology diagram in accordance with an embodiment is shown. The communication topology shown in FIG. 2B may be identical to the topology shown in FIG. 2A. However, to clarify the channels that are active prior to authentication of access device 150, the thickness of the lines corresponding to these channels have been increased.

As seen in FIG. 2B, prior to and/or after access device 150 is connected to data processing system, two communication paths to processor may be active. The first communication path may include channel 140 and channel 160 thereby facilitating communications between a device connected to access device 150 and processor 112. The second communication path may include channel 142, channel 144, and channel 162 thereby facilitating communications between a device connected to access device 150 and processor 112. The first communication path may support a first communication protocol, such as a management protocol like I2C. In contrast, the second communication path may support a second communication protocol, such as a data communication protocol like universal serial bus communications.

To enter this configuration, management controller 120 may configure mux 134 and controller 152 may configure mux 154. This configuration may be the default configuration implemented by these components until controller 152 and logic device 132 take action.

Figure 2C:
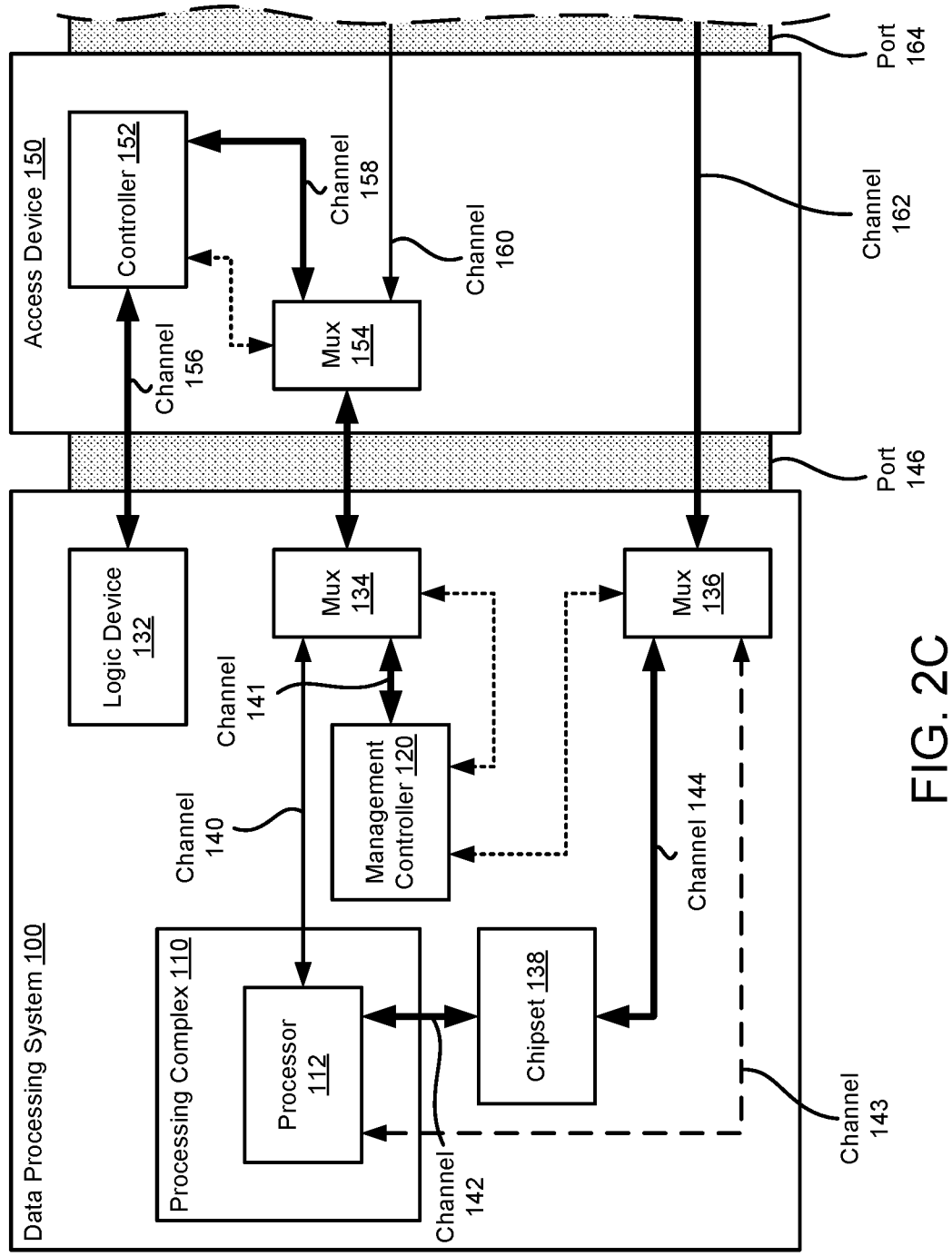

Turning to FIG. 2C, a third communication topology diagram in accordance with an embodiment is shown. The communication topology shown in FIG. 2C may be identical to the topology shown in FIG. 2A. However, to clarify the channels that are active during authentication of access device 150, the thickness of the lines corresponding to these channels have been increased.

As seen in FIG. 2C, while access device 150 is connected to data processing system, controller 152 may be connected to logic device 132 via channel 156 to announce to data processing system 100 that an access device (rather than other types of devices) has attached to it.

When an attachment is identified, logic device 132 may notify management controller 120 of the attachment. In turn management controller 120 may configure mux 134 to place it in communication with access device 150. Similarly, controller 152 may configure mux 154 to place it in communication with data processing system 100. Thus, controller 152 and management controller 120 may be operably connected via channel 141 and channel 158. This connection may allow management controller 120 to attempt to validate access device 150 through exchange of information. Until validated, the configuration of mux 136 may be maintained to maintain separation between the secure portion of processor 112 and port 146.

Figure 2D:
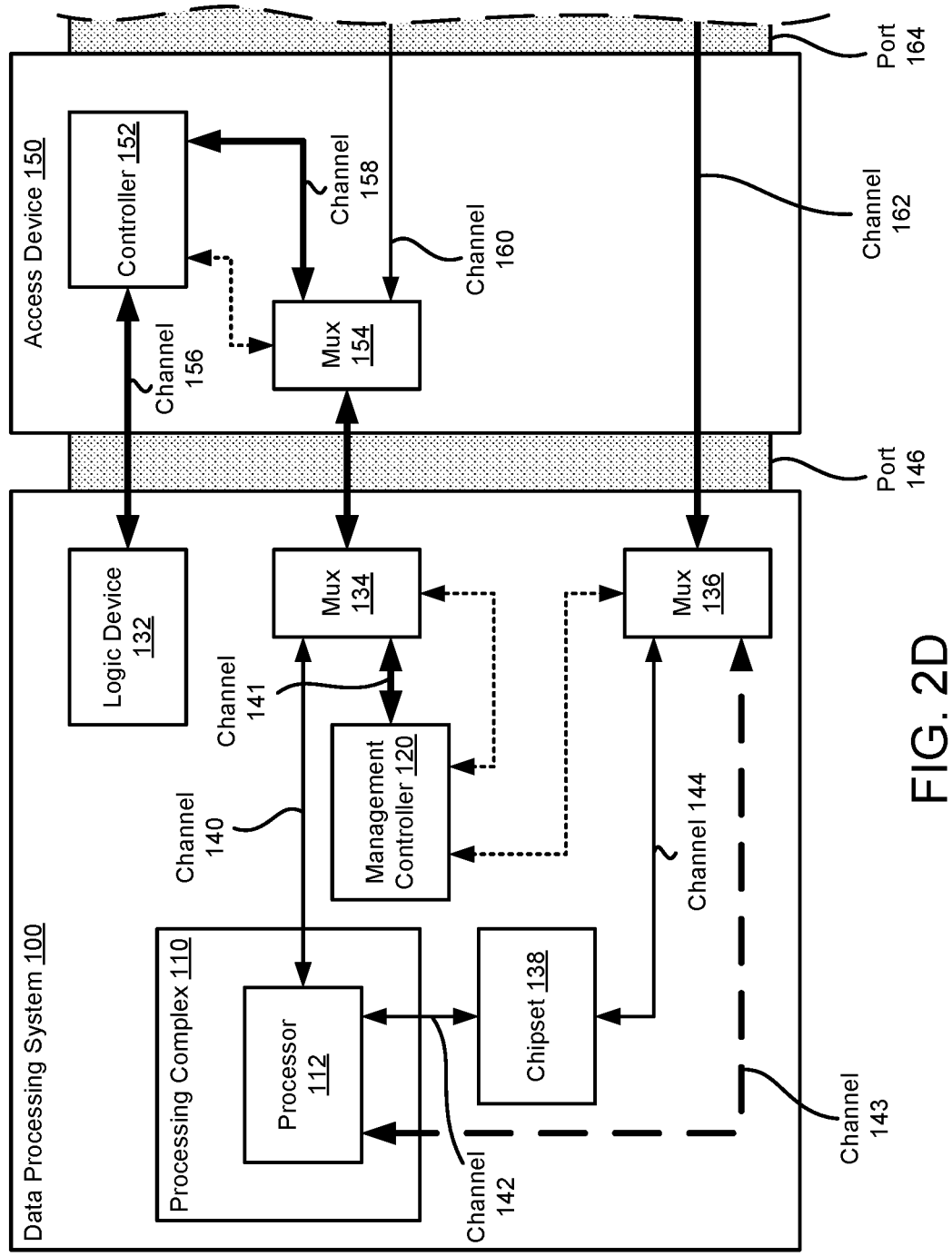

Turning to FIG. 2D, a fourth communication topology diagram in accordance with an embodiment is shown. The communication topology shown in FIG. 2D may be identical to the topology shown in FIG. 2A. However, to clarify the channels that are active after successful authentication of access device 150, the thickness of the lines corresponding to these channels have been increased.

As seen in FIG. 2D, while access device 150 is authenticated, the secure portion of processing complex 110 may be operably connected to a device connected to access device 150 via channel 143 and channel 162.

To enter this configuration, management controller 120 may configure mux 136. This configuration may be the default configuration while access device is authenticated. If access device 150 loses its authenticated status, then the communication topology may revert to that shown in FIG. 2B or 2C.

However, while connected as shown in FIG. 2D, a device connected to access device 150 (e.g., via port 164) may obtain information regarding the operation of processor 112, which may not be typically available.

As discussed above, the components of FIG. 1 may perform various methods to manage the operation of data processing systems to provide computer implemented services. FIG. 3 illustrates a method that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing a data processing system in accordance with an embodiment is shown. The method may be performed by a data processing system, an access device, components thereof such as management controllers, or other components of the system shown in FIG. 1. For example, a management controller that operates independent from, manages the operation of, and/or is hosted by a data processing system may perform the method.

At operation 300, an occurrence of an attachment of an access device is identified. The occurrence may be identified by receiving a report from a logic device of the attachment. The logic device may receive information from an access device via a port, and verify that the access device (rather than other types of devices) is attached. The information may include, for example, a device type identifier, a part number, a serial number, a public key identifier (e.g., cryptographic data), and/or other types of information. The logic device may compare the information to criteria and, if met, identify the occurrence of the attachment.

At operation 302, a first portion of an access management system is configured to place the access device in communication with a management controller. The access management system may be configured by instructing a multiplexer to modify its configuration. The access device may similarly configure a multiplexer to place a controller of the access device into communication with the management controller.

The management controller may configure the multiplexer based on the occurrence of the attachment.

At operation 304, a determination is made regarding whether the access device can be authenticated. The determination may be made by using a token (e.g., a security token, which may include cryptographic data) to attempt to validate the access device. For example, the access device may provide a public key or other type of cryptographic data. The token and public key may be used to perform a cryptographic operation to obtain a result. The result may indicate whether the access device is validated. The security token may be obtained from a management service.

If the access device is valid, the method may proceed to operation 308. Otherwise the method may proceed to operation 306.

At operation 306, access to a secure portion of the processor is denied. The access may be denied by maintaining separation between the secure portion of the processor and an external port of the data processing system.

The method may end following operation 306.

Returning to operation 304, the method may proceed to operation 308 following operation 304 if the access device is validated.

At operation 308, a second portion of the access management system is configured to place the access device in communication with the secure portion of the processor. The second portion may be configured by modifying a configuration of a second multiplexer. For example, a digital logic value may be provided to a selection pin of the second multiplexer. Doing so may operably connect the secure portion of the processor to the external port.

At operation 310, an occurrence of expiration of a security token used to authenticate the access device is identified. The expiration may be identified by (i) identifying a time limit specified by the security token and (ii) monitoring the time until the time limit is reached. Once reached, the security token may be treated as being expired. Consequently, the authentication status of the access device may revert to unauthenticated.

At operation 312, responsive to the occurrence of the expiration, the second portion of the access management system may be configured to deny access to the secure portion of the processor. The second portion may be configured, as noted above, by modifying a digital logic presented to a select input of the second multiplexer of the access management system. Doing so may revert the configuration discussed in operation 308, or may otherwise modify the internal connectivity of the data processing system (e.g., to that illustrated in FIG. 2B or 2C).

The method may end following operation 312.

Once operation 308 is completed and prior to the security token expiring, a device operably connected to the access device may be operably connected to the secure portion of the processor, or other type of hardware device. Consequently, the device may be able to access operation data for the hardware device that is otherwise not available. The operation data may be used, for example, to identify why certain undesired operation of a data processing system occurred, to identify ways to improve efficiency of use the data processing system, and/or for other purposes.

Figure 4:
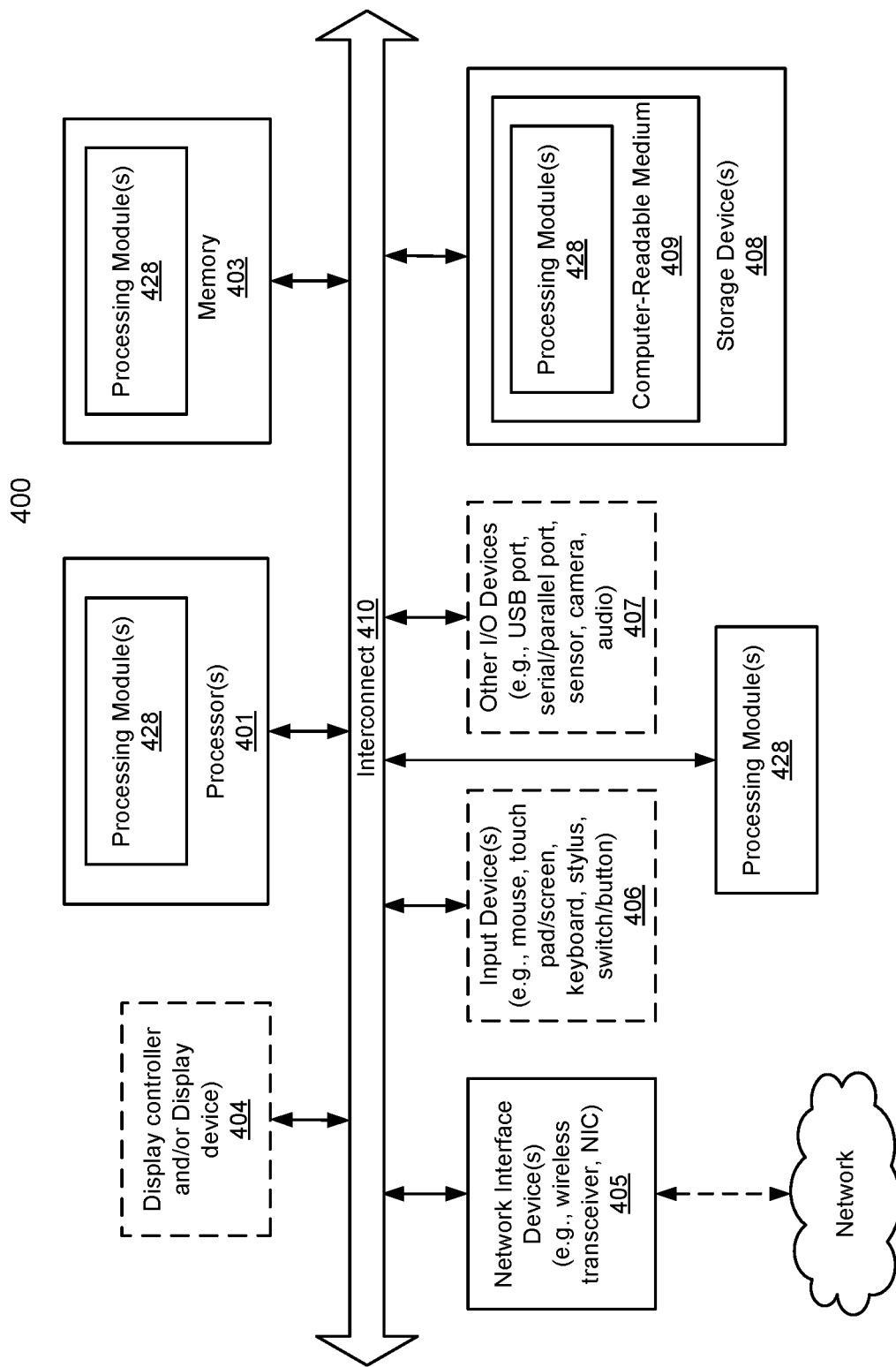
FIG. 4 shows a block diagram illustrating a data processing system in accordance with an embodiment.

Any of the components illustrated in FIGS. 1-2D may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:
   identifying an occurrence of an attachment of an access device to the data processing system;
   based on the occurrence:
     configuring a first portion of an access management system of the data processing system to place the access device in communication with a management controller of the data processing system;
     making a determination, using the management controller while in communication with the access device, regarding whether the access device can be authenticated;
     in a first instance of the determination where the access device is authenticated:
       configuring a second portion of the access management system to place the access device in communication with a secure portion of a processor;
       while the access device is in communication with the secure portion of the processor, making an identification of an occurrence of an expiration of a security token used to authenticate the access device; and
       based on the expiration, configuring the second portion of the access management system to deny access to the secure portion of the processor.

2. The method of claim 1, further comprising:
   in a second instance of the determination where the access device is not authenticated:
     denying the access device any access to the secure portion of the processor.

3. The method of claim 2, wherein identifying an occurrence of the attachment of the access device to the data processing system comprises:
   obtaining, by a logic device of the data processing system while operably connected to the access device via a 1-wire interface, a data package indicating, a type of the access device, a part number for the access device, a serial number for the access device, and a first portion of cryptographic data; and
   notifying the management controller of the occurrence of the attachment based on the data package.

4. The method of claim 3, wherein configuring the first portion of the access management system of the data processing system to place the access device in communication with the management controller of the data processing system comprises:
   configuring, by the management controller, a first multiplexer adapted to selectively connect a portion of the processor or the management controller to a port of the data processing system to which the access device is operably connected.

5. The method of claim 4, wherein configuring the second portion of the access management system to place the access device in communication with the secure portion of the processor comprises:
   configuring, by the management controller, a second multiplexer adapted to selectively connect the secure portion of the processor or an unsecure portion of the processor to the port of the data processing system to which the access device is operably connected.

6. The method of claim 5, wherein the secure portion of the processor provides access to operation information of the processor.

7. The method of claim 3, wherein making the determination comprises:
   performing a cryptographic operation using the data package and the security token to obtain a result; and
   using the result to make the determination.

8. The method of claim 6, wherein the security token is bound to the management controller, the access device, and the processor.

9. A non-transitory machine-readable medium having instructions stored therein, which when executed by a processor, cause the processor to perform operations for managing operation of a data processing system, the operations comprising:
   identifying an occurrence of an attachment of an access device to the data processing system;
   based on the occurrence:
     configuring a first portion of an access management system of the data processing system to place the access device in communication with a management controller of the data processing system;
     making a determination, while the management controller is in communication with the access device, regarding whether the access device can be authenticated;
     in a first instance of the determination where the access device is authenticated:
       configuring a second portion of the access management system to place the access device in communication with a secure portion of a host processor of the data processing system;
       while the access device is in communication with the secure portion of the host processor, making an identification of an occurrence of an expiration of a security token used to authenticate the access device; and
       based on the expiration, configuring the second portion of the access management system to deny access to the secure portion of the host processor.

10. The non-transitory machine-readable medium of claim 9, wherein the operations further comprise
    in a second instance of the determination where the access device is not authenticated:
      denying the access device any access to the secure portion of the host processor.

11. The non-transitory machine-readable medium of claim 10, wherein identifying an occurrence of the attachment of the access device to the data processing system comprises:
obtaining, from a logic device of the data processing system that is operably connected to the access device via a 1-wire interface, a data package indicating, a type of the access device, a part number for the access device, a serial number for the access device, and a first portion of cryptographic data.

12. The non-transitory machine-readable medium of claim 11, wherein configuring the first portion of the access management system of the data processing system to place the access device in communication with the management controller of the data processing system comprises:
configuring a first multiplexer adapted to selectively connect a portion of the host processor or the management controller to a port of the data processing system to which the access device is operably connected.

13. The non-transitory machine-readable medium of claim 12, wherein configuring the second portion of the access management system to place the access device in communication with the secure portion of the host processor comprises:
configuring a second multiplexer adapted to selectively connect the secure portion of the host processor or an unsecure portion of the host processor to the port of the data processing system to which the access device is operably connected.

14. The non-transitory machine-readable medium of claim 13, wherein the secure portion of the host processor provides access to operation information of the host processor.

15. The non-transitory machine-readable medium of claim 11, wherein making the determination comprises:
performing a cryptographic operation using the data package and the security token to obtain a result; and
using the result to make the determination.

16. The non-transitory machine-readable medium of claim 15, wherein the security token is bound to the management controller, the access device, and the host processor.

17. A data processing system, comprising:
a first processor; and
a management controller comprising:
a second processor;
a memory coupled to the second processor to store instructions, which when executed by the second processor, cause the second processor to perform operation, the operations comprising:
identifying an occurrence of an attachment of an access device to the data processing system; and
based on the occurrence and by the second processor of the management controller:
configuring a first portion of an access management system of the data processing system to place the access device in communication with a management controller of the data processing system;
making a determination, while the management controller is in communication with the access device, regarding whether the access device can be authenticated;
in a first instance of the determination where the access device is authenticated:
configuring a second portion of the access management system to place the access device in communication with a secure portion of the first processor;
while the access device is in communication with the secure portion of the first processor, making an identification of an occurrence of an expiration of a security token used to authenticate the access device; and
based on the expiration, configuring the second portion of the access management system to deny access to the secure portion of the first processor.

18. The data processing system of claim 17, wherein the operations further comprise
in a second instance of the determination where the access device is not authenticated:
denying the access device any access to the secure portion of the first processor.

19. The data processing system of claim 18, wherein identifying an occurrence of the attachment of the access device to the data processing system comprises:
obtaining, from a logic device of the data processing system that is operably connected to the access device via a 1-wire interface, a data package indicating, a type of the access device, a part number for the access device, a serial number for the access device, and a first portion of cryptographic data.

20. The data processing system of claim 19, wherein configuring the first portion of the access management system of the data processing system to place the access device in communication with the management controller of the data processing system comprises, by the second processor:
configuring a first multiplexer adapted to selectively connect a portion of the first processor or the management controller to a port of the data processing system to which the access device is operably connected.

* * * * *